(12) United States Patent
Ramankutty et al.

(10) Patent No.: US 8,428,625 B2
(45) Date of Patent: Apr. 23, 2013

(54) PAGING HEURISTICS IN PACKET BASED NETWORKS

(75) Inventors: Rajesh Ramankutty, Nashua, NH (US); Kuntal Chowdhury, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 12/715,285

(22) Filed: Mar. 1, 2010

(65) Prior Publication Data

US 2010/0220680 A1 Sep. 2, 2010

Related U.S. Application Data

(60) Provisional application No. 61/156,366, filed on Feb. 27, 2009.

(51) Int. Cl.
*H04W 68/00* (2009.01)
*H04W 24/00* (2009.01)
*H04H 20/71* (2008.01)

(52) U.S. Cl.
USPC .......................... 455/458; 455/456.1; 370/312

(58) Field of Classification Search .................. 455/458, 455/456.1; 370/312
See application file for complete search history.

(56) References Cited

U.S. PATENT DOCUMENTS

| 5,153,902 | A | * | 10/1992 | Buhl et al. ................. 455/432.1 |
| 5,940,762 | A | | 8/1999 | Lee et al. |
| 5,995,832 | A | | 11/1999 | Mallinckrodt |
| 6,438,383 | B1 | * | 8/2002 | Hall et al. ..................... 455/458 |
| 6,553,217 | B1 | | 4/2003 | Kundorf et al. |
| 6,748,247 | B1 | | 6/2004 | Ramakrishnan et al. |
| 6,781,972 | B1 | | 8/2004 | Anderlind et al. |
| 7,154,868 | B1 | | 12/2006 | Sharma et al. |
| 7,289,480 | B2 | | 10/2007 | Lundstrom et al. |
| 7,489,936 | B1 | * | 2/2009 | Liu ............................ 455/456.1 |
| 2002/0057649 | A1 | * | 5/2002 | Kinnunen ..................... 370/230 |
| 2002/0105970 | A1 | | 8/2002 | Shvodian |
| 2003/0026211 | A1 | | 2/2003 | Xu et al. |

(Continued)

OTHER PUBLICATIONS

3GPP TS 23.401 v8.3.0 (Sep. 2008), 3rd Generation Partnership Project; Technical Specification Group Services and System Aspects; General Packet Radio Service (GPRS) enhancements for Evolved Universal Terrestrial Radio Access Network (E-UTRAN) access (Release 8), http://www.3gpp.org. 204 pages.

(Continued)

*Primary Examiner* — Jinsong Hu
*Assistant Examiner* — Opiribo Georgewill
(74) *Attorney, Agent, or Firm* — Wilmer Cutler Pickering Hale and Dorr LLP (57) ABSTRACT

This disclosure relates to systems and methods for paging devices in a communication network. A network device providing mobility management through control messaging can be assigned a number of cell sites in a tracking area. The network device such as a mobility management entity (MME) can use a criteria or heuristic based implementation to provide a hierarchy for contacting a mobile device with a page. The criteria or heuristic based implementation can page a subset of the total number of cell sites in a tracking area and expand the subset after unsuccessful attempts to page the mobile device. The implementation can also be tailored to offer a range of options for page requests received by a network device, which can be based on such things as the application sending the page request.

19 Claims, 6 Drawing Sheets

U.S. PATENT DOCUMENTS

| | | | |
|---|---|---|---|
| 2003/0221016 A1 | 11/2003 | Jouppi et al. | |
| 2003/0235171 A1 | 12/2003 | Lundstrom et al. | |
| 2004/0022212 A1 | 2/2004 | Chowdhury et al. | |
| 2004/0022258 A1 | 2/2004 | Tsukada et al. | |
| 2004/0109426 A1 | 6/2004 | Veerepalli et al. | |
| 2004/0120283 A1 | 6/2004 | Rezaiifar et al. | |
| 2004/0151155 A1 | 8/2004 | Jouppi | |
| 2004/0152422 A1 | 8/2004 | Hoglund et al. | |
| 2004/0203825 A1 | 10/2004 | Daniel et al. | |
| 2004/0203894 A1 | 10/2004 | Watanabe et al. | |
| 2004/0205247 A1 | 10/2004 | Ahn | |
| 2005/0003856 A1 | 1/2005 | Jang et al. | |
| 2005/0025116 A1 | 2/2005 | Chen et al. | |
| 2005/0044138 A1 | 2/2005 | Albert et al. | |
| 2005/0129013 A1 | 6/2005 | Rasanen | |
| 2005/0136884 A1 | 6/2005 | Reidelsturz et al. | |
| 2005/0149754 A1 | 7/2005 | Rasanen | |
| 2005/0159167 A1 | 7/2005 | Hakalin et al. | |
| 2007/0259673 A1 | 11/2007 | Willars et al. | |
| 2008/0130568 A1 | 6/2008 | Gallagher et al. | |
| 2009/0129307 A1* | 5/2009 | Akhtar et al. | 370/312 |
| 2009/0176513 A1* | 7/2009 | Bosch et al. | 455/458 |
| 2009/0286528 A1* | 11/2009 | Lie et al. | 455/422.1 |
| 2010/0075698 A1* | 3/2010 | Rune et al. | 455/458 |
| 2010/0124223 A1 | 5/2010 | Gibbs et al. | |
| 2011/0286465 A1 | 11/2011 | Koodli et al. | |
| 2012/0063464 A1 | 3/2012 | Mehta | |

OTHER PUBLICATIONS

3GPP TS 23.402 v8.3.0 (Sep. 2008), 3rd Generation Partnership Project; Technical Specification Group Services and System Aspects; Architecture enhancements for non-3GPP accesses (Release 8), http://www.3gpp.org. 190 pages.

3GPP TS 29.212 v8.1.0 (Sep. 2008), 3rd Generation Partnership Project; Technical Specification Group Core Network and Terminals; Policy and Charging Control over Gx reference point (Release 8), http://www.3gpp.org. 60 pages.

Alcatel-Lucent. "MME Overload Control by Throttling of DL Low Priority Traffic." Mobile Competence Centre. Meeting #81. Prague, Czech Republic. Oct. 11-15, 2010. 7 pages.

Alcatel-Lucent. "NIMTC-MME-SGSN Overload Control by DL MTC Traffic Throttling." 3GPP Draft; S2-102488, Mobile Competence Centre; 650, Route Des Lucioles; F-06921, France. vol. SA WG2, Meeting # 79. Kyoto, Japan. May 10-14, 2010. 2 pages.

Huawei. "IMS Multimedia Priority Services Solution for eMPS." 3GPP Draft; S2-101087, Mobile Competence Centre. Meeting #77. San Francisco, Feb. 22-26, 2010. 4 pages.

International Search Report and Written Opinion for International Application No. PCT/US11/37407 mailed Jul. 27, 2011. 15 pages.

International Search Report and Written Opinion issued for PCT/US09/64979, mailed Feb. 25, 2010 (7 pages).

* cited by examiner

PAGING HEURISTICS IN PACKET BASED NETWORKS

CROSS-REFERENCE TO RELATED APPLICATIONS

This application claims benefit under 35 U.S.C. §119(e) of U.S. Provisional Patent Application No. 61/156,366, entitled "Paging Heuristics in Packet Based Networks," filed Feb. 27, 2009, which is hereby incorporated by reference herein in its entirety.

FIELD OF THE DISCLOSURE

This disclosure relates to systems and methods for paging devices in a communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

SUMMARY OF THE DISCLOSURE

Methods and systems for paging devices in a communication network are provided. A network device providing mobility management can be assigned a number of base stations in a tracking area. The network device such as a mobility management entity (MME) can use a heuristic based implementation to provide a hierarchy for contacting a mobile device with a page. The heuristic based implementation can page a number of base stations, for example, based on location information or based on algorithms to reach a mobile device with certain level of probability. The implementation can be tailored to offer a range of options for page requests received by a network device, which can be based on such things as the application sending the page request.

In some embodiments, a method of paging a user equipment (UE) from a mobility management entity (MME) in a communication network is disclosed, where the communication network includes a plurality of eNodeBs that are arranged into at least one tracking area, the method including maintaining, at the MME, a list of eNodeBs from which the UE was actively communicating with the communication network, receiving a page request for the UE at the MME and locating the tracking area where the UE was last registered, sending a first page request to a first subset of the eNodeBs in the tracking area based on the list of eNodeBs from which the UE was last actively communicating, and sending a second page request to a second subset with at least some different eNodeBs than the first subset, if a response is not received after the first page request.

In certain embodiments, a mobility management entity (MME) is disclosed that communicates with at least one eNodeB in a communication network to page a user equipment (UE), and where the communication network includes a plurality of eNodeBs that are arranged into at least one tracking area, the MME including a storage medium configured to store a list of eNodeBs from which the UE was actively communicating with the communication network, a physical interface configured to receive a page request for the UE where the page request includes the tracking area where the UE was last registered, and to send page requests to at least one eNodeB, and a processing unit configured to run a heuristic for determining to selectively send page requests to the plurality of eNodeBs in the tracking area including initiating a sending of a first page request to at least one eNodeB based on the list of eNodeBs from which the UE was last actively communicating and initiating a sending of a second page request to a second set of eNodeBs based on whether the first page request was successful.

In yet other embodiments, a method of paging a user equipment (UE) from a chassis coupled to a communication network is disclosed, where the communication network includes a plurality of cell sites that are arranged into at least one tracking area, the method including maintaining, at the chassis, information regarding the plurality of cell sites in the tracking area, receiving, at the chassis, a page request for the UE and locating the tracking area where the UE was last registered, sending a page request to a subset of the plurality of cell sites in the tracking area based on the information at the chassis including the cell site from which the UE was last actively communicating with the communication network, and determining, at the chassis, if a subsequent page request is sent to a plurality of cell sites to locate the UE in the communication network.

DETAILED DESCRIPTION

Systems and methods of providing selective paging in a communication network are disclosed in certain embodiments. A page can be a message sent from a network device, such as a server or a correspondent node in the communication network in order to begin communications with a mobile device, such as user equipment (UE), access terminal (AT), or other device. Pages are typically sent on a one-way control channel from a network device to a mobile user. Pages can be sent according to a protocol and in a manner that allows a mobile device to conserve power by idling many functions while not in use, and by waking up to listen for a specific paging message before activating. The message, a page, can indicate to the mobile device that a network device has information for the mobile device or desires to establish a session with the mobile device. The page can prompt the mobile device to send a response that results in the establishment of a radio connection with a base station in order to receive information on a data path. Multiple levels of paging messages can be used; for example, there can be a short page message that causes the mobile device to wake for a longer page message.

In order to locate a mobile device that is conserving power, a page message may be sent to many base stations in order to locate the mobile device. If the page is broadcast to a number of base stations, this can lead to inefficiencies in using communication network resources. This is because each base station receiving a page broadcasts the page over the radio spectrum in order to determine if the mobile device is within range of the base station. If the mobile device is within range, then the mobile device responds and this location information can be relayed back to the network. In some network topologies, such as long term evolution (LTE), a mobility management entity (MME) is responsible for paging the mobile device, such as user equipment (UE), within the UE's registered tracking area. The tracking area can include a number of base stations, such as eNodeBs (eNBs), which need to be paged depending on the size of the tracking area.

Figure 1:
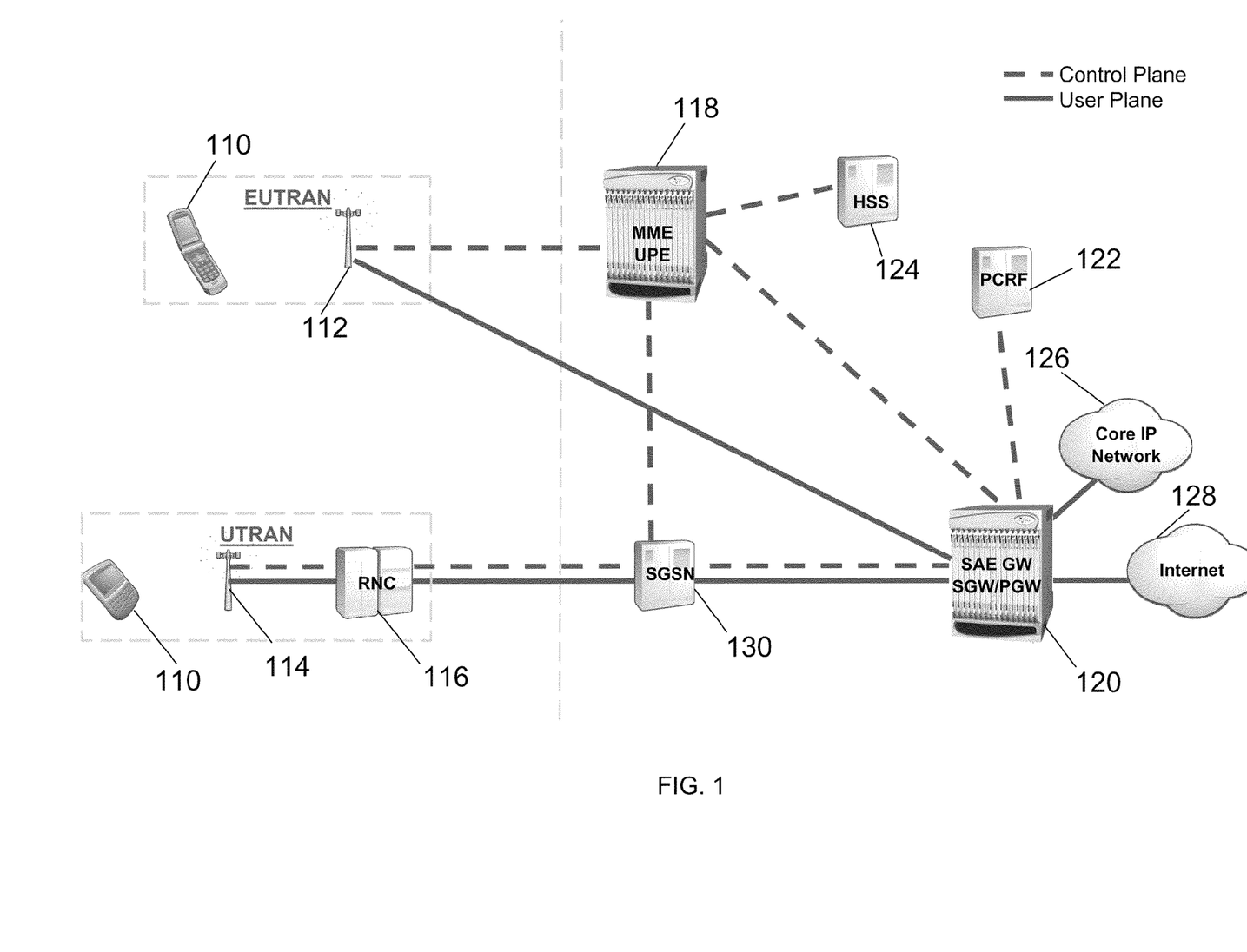
FIG. 1 illustrates a network diagram in accordance with certain embodiments.

FIG. 1 illustrates a network diagram in accordance with certain embodiments. FIG. 1 illustrates both a universal mobile telecommunication system (UMTS) release 8 network and a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, and Serving General packet radio service Support Node (SGSN) 130. The MME 118, SAE GW 120, and SGSN 130 can be implemented in a gateway as described below. The SAE GW 120 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components.

MME 118, which can be implemented on chassis as described below, is a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 standards (CDMA 1X and EVDO).

Figure 2:
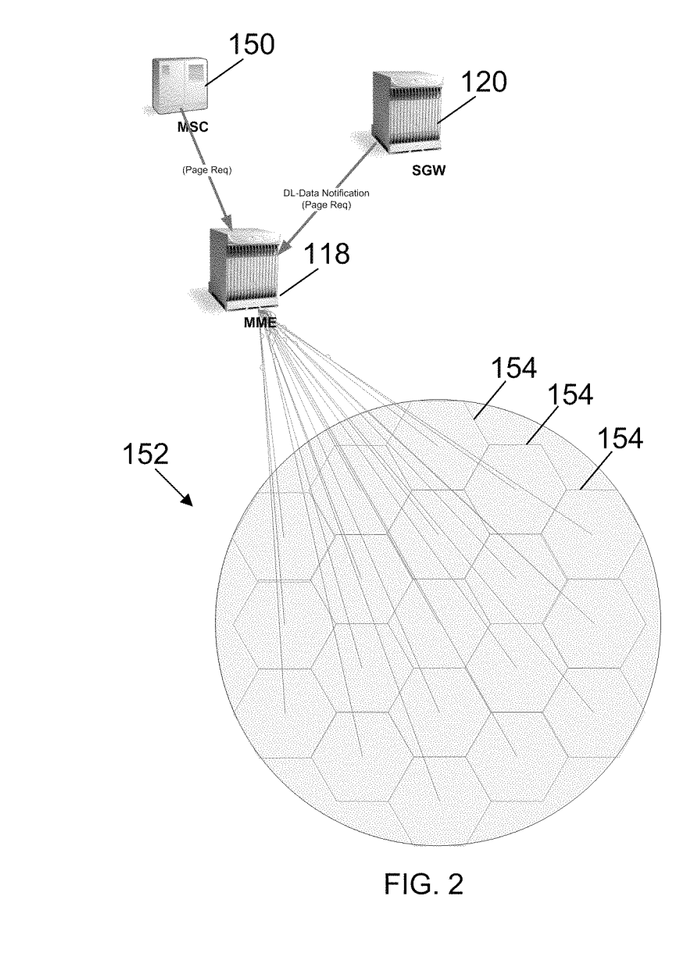
FIG. 2 illustrates sending of paging messaging through a network to base stations.

FIG. 2 illustrates communication of page messaging through a communication network to base stations, such as eNodeBs. FIG. 2 includes a MME 118, a SGW 120, a mobile switching center (MSC) 150, and a tracking area 152 of eNodeB cell sites including eNodeB cells 154. The page requests can originate from a SGW 120 or from a MSC 150. MSC 150 can be a gateway device that interfaces with the Public Switched Telephone Network (PSTN) to provide communication between circuit-switched phones and devices and the operator's access network including MME 118 and other devices such as SAE GW 120. A page request originating from MSC 150 can be provided when the user of a landline phone is trying to call a mobile device in the wireless communication network. The SGW 120 can provide a page request relating to data received that is intended for the mobile device from the packet data network, e.g., the Internet, or from another mobile device. Voice over IP calls can also come through the SGW 120, in some embodiments. The page request from SGW 120 can be a downlink data notification.

The MME 118 provides paging to mobile devices such as UEs. The MME 118 is specified to send the page to all eNodeB cells 154 in tracking area 152 where the UE was last registered. As shown, this can lead to a page being sent to a number of eNodeB cells 154 and subsequently being transmitted over the paging channel by a number of eNodeBs to find a mobile device.

Figure 3:
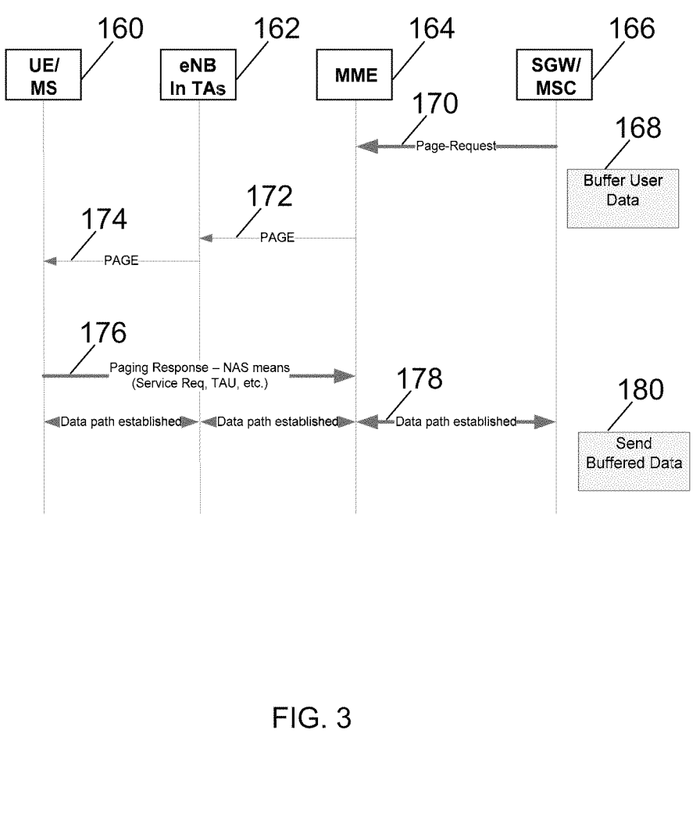
FIGS. 3, 3A, and 3B illustrate paging signaling flows in accordance with certain embodiments.

FIG. 3 illustrates a signaling flow for a paging request to a tracking area 152 in accordance with certain embodiments.

FIG. 3 includes user equipment (UE) 160, an eNB 162 in the tracking area, a MME 164, and a SGW/MSC 166. In 168, data is received at the SGW/MSC 166 and is buffered. The SGW/MSC 166 can generate a page request to locate and establish communications with UE 160. A page request 170 is sent from SGW/MSC 166 to MME 164 to prompt MME 164 to send a page out to the eNBs in the tracking area. MME 164 receives the page request 170 and sends a page 172 to the eNBs in the tracking area, such as eNB 162. The eNB 162 sends a page 174 out on the radio frequency (RF) airwaves to reach the UE 160. If the UE 160 is within the range of an eNB 162 in the tracking area, the UE 160 sends a paging response 176 to MME 164. The paging response can include non-access stratum (NAS) information such as a service request and a tracking area update (TAU). A data path 178 is established from the UE 160 to the SGW/MSC 166 and the buffered data can be sent to the UE in 180.

The LTE network tracks the location of user equipment (UE) based on a tracking area identity (TAI). A list of tracking area identities can be assigned to the UE during an attach procedure and subsequently during tracking area update (TAU) and globally unique temporary user equipment identity (GUTI) relocation procedures. In the case of inter-radio access technology (2G/3G), the UE location tracking can be based on location area identity. For the registration in the network, the MME 118 can give the MSC 150 the 2G/3G location area ID (LAI) in which the mobile device is currently 'theoretically' located. This identifier can be computed out of the TAI, which is the corresponding identifier in a LTE network.

Figure 3A:
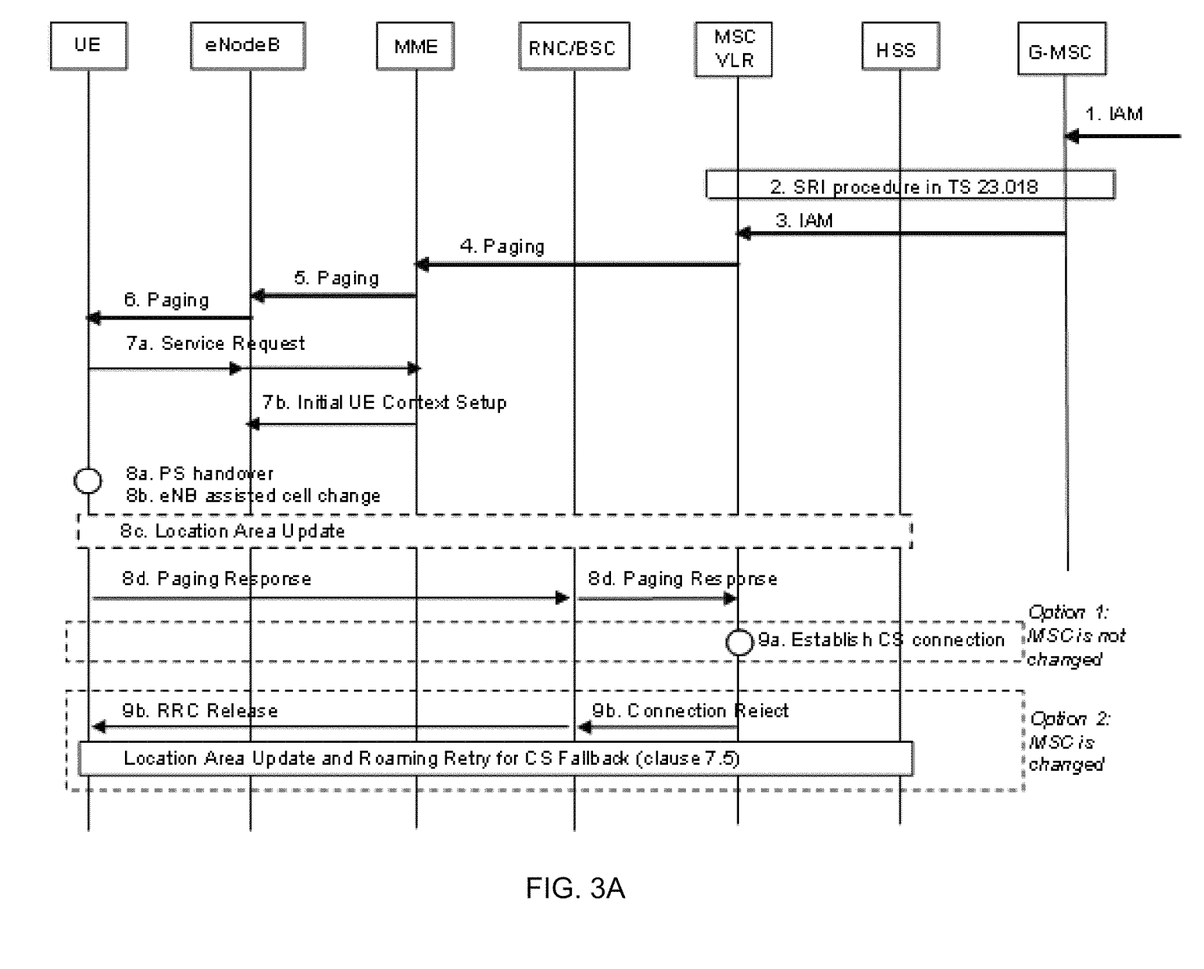

FIG. 3A illustrates a voice paging signaling flow when the user equipment is in idle mode in accordance with some embodiments. The network devices shown in the signaling flow include gateway mobile switching center (G-MSC), home subscriber server (HSS), mobile switching center (MSC)/visitor location register (VLR), a radio network controller (RNC)/base station controller (BSC), a MME, an eNodeB, and a UE. In 1, G-MSC receives an initial address message (IAM) from the circuit switched network. In 2, the G-MSC retrieves routing information of the UE by using send routing information (SRI) procedures. In 3, the G-MSC sends an IAM to the MSC/VLR on the terminating side of the network. In 4, the MSC/VLR sends the MME a paging message from the MSC over a SGs interface. The paging message can include an IMSI, a VLR temporary mobile subscriber identity (TMSI), and location information.

The MME uses the TMSI (or IMSI) to page the UE in the tracking areas (TAs). If the MME does not have a stored tracking area list for the UE, the MME can use location information received from the MSC to page the UE. The MME can acts like a 2G/3G SGSN that can forward the page-notification to the UE or mobile device on the MSC's behalf.

In 5, the MME sends a paging message to each eNodeB. The Paging message can include a suitable UE Identity (e.g., a S-TMSI or IMSI) and a CN Domain Indicator set to circuit switched (CS) by the MME. In 6, the radio resource part of the paging procedure takes place from the eNodeB to the UE. In 7a, the UE establishes a radio resource control (RRC) connection and sends a service request to the MME. The UE indicates its S-TMSI in the RRC and S1-AP messages to the MME. The CS fallback indicator which can be included in the RRC message indicates to the MME that CS fallback for this UE can be implemented. In 7b, MME sends S1-AP: initial UE context setup message that can include UE capabilities, CS fallback indicator and other parameters to indicate to the eNodeB to move the UE to UTRAN/GERAN.

In 8a, the target radio access technology (RAT) has packet switched (PS) handover capability, and upon receipt of the initial UE context setup message with a CS fallback indicator, the eNodeB may optionally solicit measurement reports from the UE to determine the target cell to which packet switched handover is performed. If the handover from the E-UTRAN command contains a CS fallback indicator and the UE fails to establish connection to the target radio access technology, then the UE may consider the CS fallback a failed attempt. In the alternative, in 8b, the target ratio access technology has no packet switched handover capability. Upon receipt of the initial UE context setup message with a CS fallback indicator the eNodeB may optionally solicit measurement reports from the UE to determine the target cell to redirect the UE to. The eNB can then release the RRC connection with redirection information to change to a circuit switched capable radio access technology (RAT, frequency, cell info). If the inter-RAT cell change order contains a CS fallback indicator and the UE fails to establish connection to the target RAT, then the UE may consider the CS fallback a failed attempt. In 8c, if the UE obtains LA/RA information of the new UTRAN/GERAN cell (e.g., based on the system information or redirection information) and the LA/RA of the new cell is different from the one stored in the UE, it performs a location area update or a combined RA/LA procedure if the target system operates in network mode of operation (NMO).

In 8d, the UE responds with a page response message to the MSC as follows: (i) if the target RAT is UTRAN or GERAN Iu mode, the UE establishes an RRC connection and responds to the paging in an RRC Initial Direct Transfer. The CN domain indicator is set to "CS" in the initial direct transfer message. When received at the RNC, the paging response message is sent in a Radio Access Network Application Protocol (RANAP) initial UE message to the MSC. (ii) Alternatively, if target RAT is GERAN A/Gb mode, the UE establishes a signaling link and the UE enters either dual transfer mode or dedicated mode and the CS call establishment procedure completes.

In 9a, in case the MSC serving the 2G/3G cell is the same as the MSC that served the UE while on LTE the network, it can stop the paging response timer and establish the CS connection. In 9b, if the MSC that receives the paging response is different from the MSC that sent the paging request and if the location area update/combined RA/LA update was not performed in step 8c, the MSC rejects the page response by releasing the A/Iu-cs connection. The BSC/RNC in turn releases the RRC/RR connection. The RRC/RR release triggers the UE to perform a location area update as follows: (i) if the target system operates in network mode of operation (NMO) I, the UE performs a combined RA/LA update, but (ii) if the target system operates in NMO II or III, the UE performs a location area update towards the MSC.

Figure 3B:
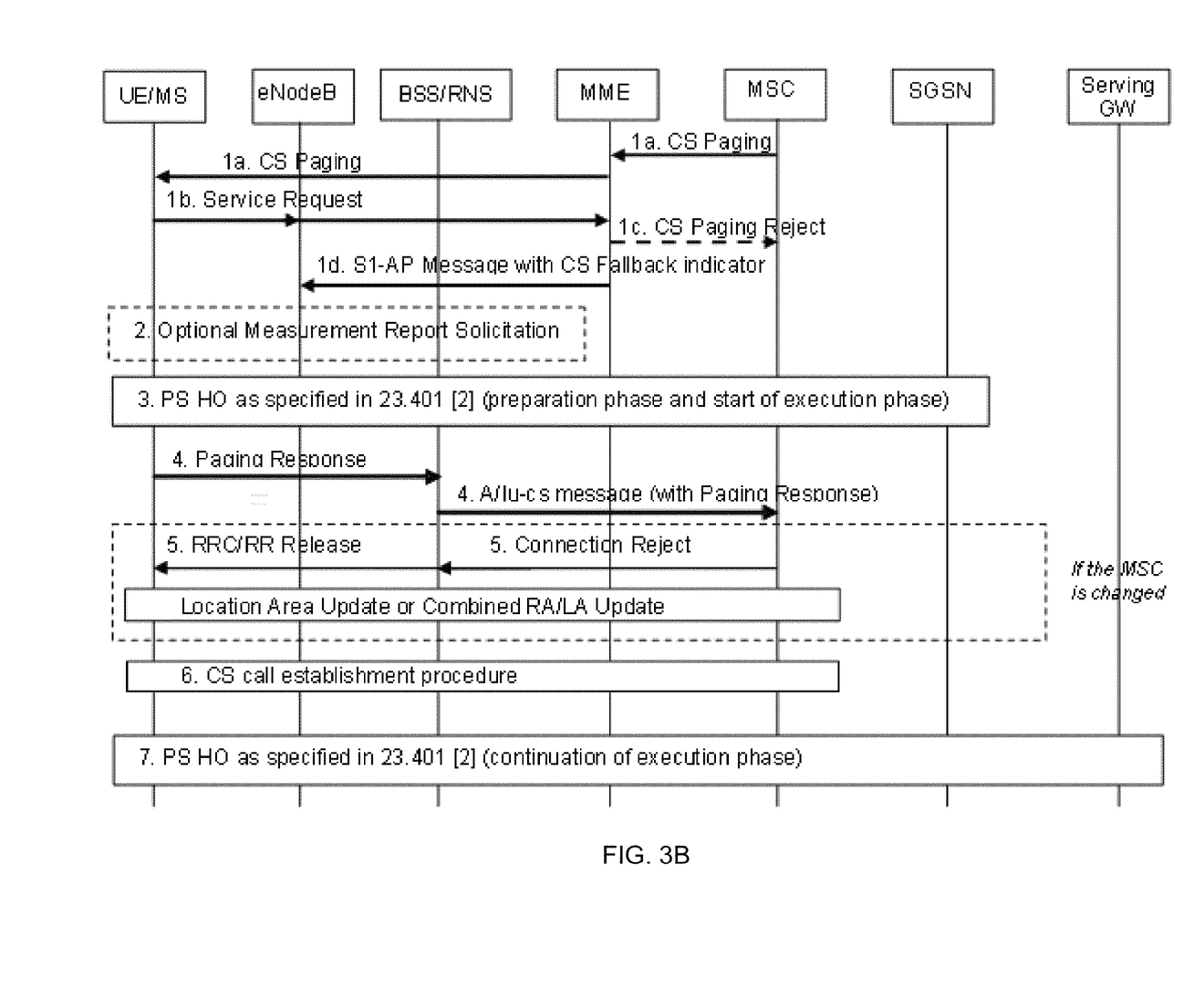

FIG. 3B illustrates a voice paging signaling flow when the user equipment is in active mode in accordance with some embodiments. The network devices show in the signaling flow include a serving gateway, a serving general packet radio service support node (SGSN), a mobile switching center (MSC), a MME, a base station subsystem (BSS)/radio network subsystem (RNS), an eNodeB, and a UE. In 1a, the MSC receives an incoming voice call and responds by sending a circuit switched page with IMSI or TMSI, optional caller ID and connection management information, and CS call type indicator to the MME via the SGs interface. If the call is in active mode, the MME uses the existing S1-MME connection to page the UE. The MSC sends pages for UE's that provide location information using the SGs interface. In 1b, the UE sends a service request message to the MME that includes the CS fallback indicator. In 1c, upon receiving the service request, the MME sends a paging reject message to the MSC to stop the circuit switched paging procedure. In 1d, the MME sends an S1-AP Request message to the eNB that includes the UE radio capabilities and a CS fallback indicator. This message indicates to the eNB that the UE can be moved to UTRAN/GERAN.

In 2, the eNB may request an optional measurement report from the UE to determine the target 2G/3G cell where the packet switched handover will occur. In 3, the eNodeB triggers a packet switched handover to a GERAN/UTRAN neighbor cell by sending a handover required message to MME. As part of this handover, the UE receives a handover from an E-UTRAN command and tries to connect to a cell in the target radio access technology. The handover from E-UTRAN command may contain a CS fallback indicator which indicates to UE that the handover was triggered due to a CS fallback request. In 4, if the target RAT is UTRAN or GERAN Iu mode the UE establishes an RRC connection and responds to the paging by sending an RRC paging response. In 5, this procedure is only required if the target and source MSC's are different. In this case, the target MSC rejects the page response message and release the Iu UTRAN connection or A/Gb GERAN connection. In 6, the circuit switched call establishment procedure is started. In 7, after the UE completes its attachment to the target radio access technology in a packet switched handover, it may trigger a routing area update when it is possible to send uplink packet data.

Figure 4:
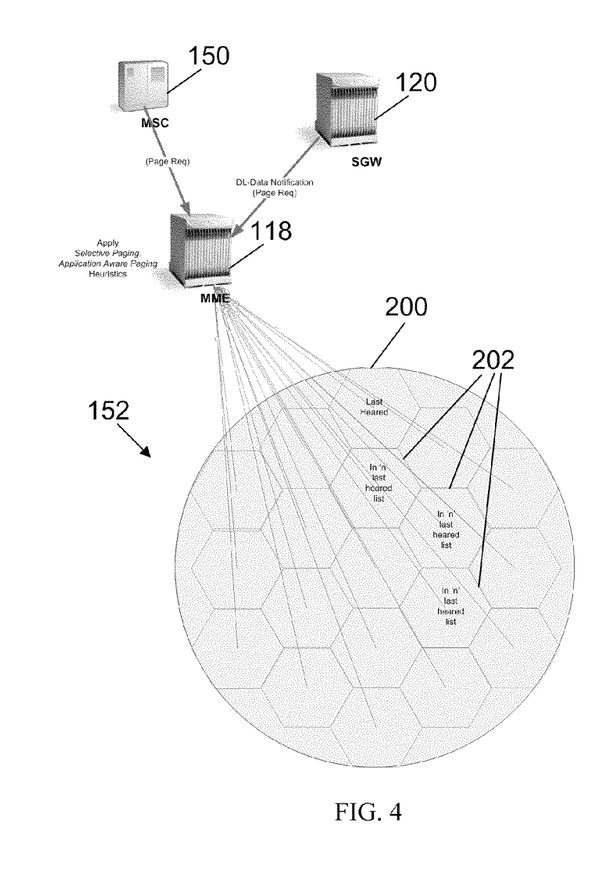
FIG. 4 illustrates sending of page messaging using selective criteria in accordance with certain embodiments.

FIG. 4 illustrates sending of page messaging using selective criteria in accordance with certain embodiments. The selective criteria can be heuristics or other rules that determine which base stations are to be sent a page. The heuristics based paging can include keeping a list of a specified number of eNBs inside the tracking area from which the UE was last heard. For example, this can include the last five non-duplicative tracking area identities (TAI) from which there was communication with a UE. The list can also collect location information from the UE or base station, such as a cell ID or other eNB identifying information.

In FIG. 4, a SGW 120 and a MSC 150 can both send page requests to MME 118. The MME 118 upon receiving a page request can apply a heuristic to send one or more pages within the tracking area. The MME 118 can first send a page to the eNB cell site from which the UE was last heard 200. The MME 118 can then send a page to the eNB cell sites on a specified list (a recent activity list), which would include the last 'n' number of cell sites from which the UE was heard 202. Location information can also be used to determine the cell sites to be included in a page. For example, the location information received at the MME regarding the UE's location (such as a TAI) can be used to send a page request to this cell site as well as neighboring cell sites. The neighboring cell sites can include immediately adjacent cell sites or the cell sites within a certain range of the last cell site. A combination of a list of cell sites from which the UE last actively communicated in conjunction with location information can be used to page the UE. A paging heuristic based on activity and location information can be tiered such that the most recent cell site and surrounding cell sites are paged first. Additionally, the activity list can include information regarding frequency of communication from a cell site and timing of the last communication. This timing and frequency information can be used to determine the set of cell sites that are paged.

In subsequent page attempts the MME 118 can expand the scope in each successive paging of the cell sites included (e.g., page the last 'n' eNBs, then the next 'n' or 'm' eNBs—with m different from n). The subsequent page attempts can also send a page to all the eNBs belonging to the tracking area (e.g., flood paging). The page attempts can also exclude previously paged eNBs. For example, if the last heard cell site 200 is paged first, then this can be excluded when the 'n' last heard cell sites 202 are paged. The list of eNBs last heard can be used to identify the commonly and regularly used by a subscriber. In determining when to initiate a subsequent page attempt, the heuristic can use a timer or specified delay, a trigger, or some other external indication. The specified delay can be set to be longer than the time it takes to receive a page response back from a UE. The specified delay may be based on statistical information that is collected on the chassis regarding page response times to page requests. Upon receiving the page response, the MME 118 can begin establishing a data path and refrain from subsequent paging.

The size of the recent activity list, which includes a number of cell sites last visited by the UE, can be based on a number of factors. These factors include the amount of memory available on the chassis running the MME functionality and the number of base stations such as eNBs in the tracking area. The size of the tracking area can be specified by the network operator and can be as large as 60,000 eNBs. The tracking area can also be on the size of 1,000-20,000, as this is dependent on conditions in the communications network. The relative size of the tracking area can influence the number of eNBs that are paged prior to paging the entire tracking area. The number of eNBs paged can be a number sufficient that there is a certain probability of reaching the UE in an attempt. For example, the number can be sufficient to guarantee an 80 percent chance of reaching the UE. The 'n' number of eNBs that were last heard from can range from 2 to 5 eNBs in a smaller tracking area to 20 to 50 in a larger tracking area. For example, 'n' can be a percentage of the total size of the tracking area ranging from one to ten percent that are included on the recent activity list. The activity list can be implemented using a data structure in a computer readable medium or other storage medium that includes information used in determining the cell sites to page. The information can include UE information, location information, timing of last activity, and frequency of activity from a cell site. The activity list can also be implemented in a first in first out (FIFO) buffer where a cell site, such as an eNB, The heuristic based paging can include a selective paging aspect. Selective paging when included in the heuristic determines how various page requests are handled when received by the MME 118. For example, the MME can only send page requests it deems come from an authorized application. The determination can be made by MME 118 by checking a list of authorized applications. This could include a page from one VoIP provider (SIP message), but not from a different VoIP provider.

Another type of paging that can be implemented in conjunction with heuristic paging is application aware paging. In application aware paging, handling priorities are assigned based on the application type. These handling priorities can be determined in the MME 118 by inspecting the page, for example, the page header or based on an identifier included in the page. The priority used in application aware based heuristic allows handling of the page based on the delay sensitivity of the application. This allows the MME 118 to tailor the heuristic applied to a page depending on the possible delay that might occur from paging subsets of the tracking area list. For example, when the MME 118 receives a VoIP page, it determines that the voice call is delay sensitive and so rather than first paging only the last heard eNB, it pages the last "n+5" heard eNB sites and then the entire tracking area. The MME 118 can also decide to send a delay sensitive application page to the entire tracking area depending on the priority assigned to the application. Various priority designations can be used in the paging heuristics. For a non delay sensitive application, such as email, the MME pages the last heard, then pages the last "n" heard, then pages the last "2n" heard, and then pages the remaining tracking area.

In some embodiments, by using paging heuristics the UE is paged in a smaller set of eNBs where it is most likely to be located, which reduces the load on the network. In certain embodiments, in combination with the MME page heuristics, the serving gateway (SGW) supports Idle-Mode access control lists (for both IPv4 & IPv6 user-plane packets) to permit/deny downlink user traffic from initiating a DL-Data-Indication to the MME and causing/preventing unwanted paging.

Figure 5:
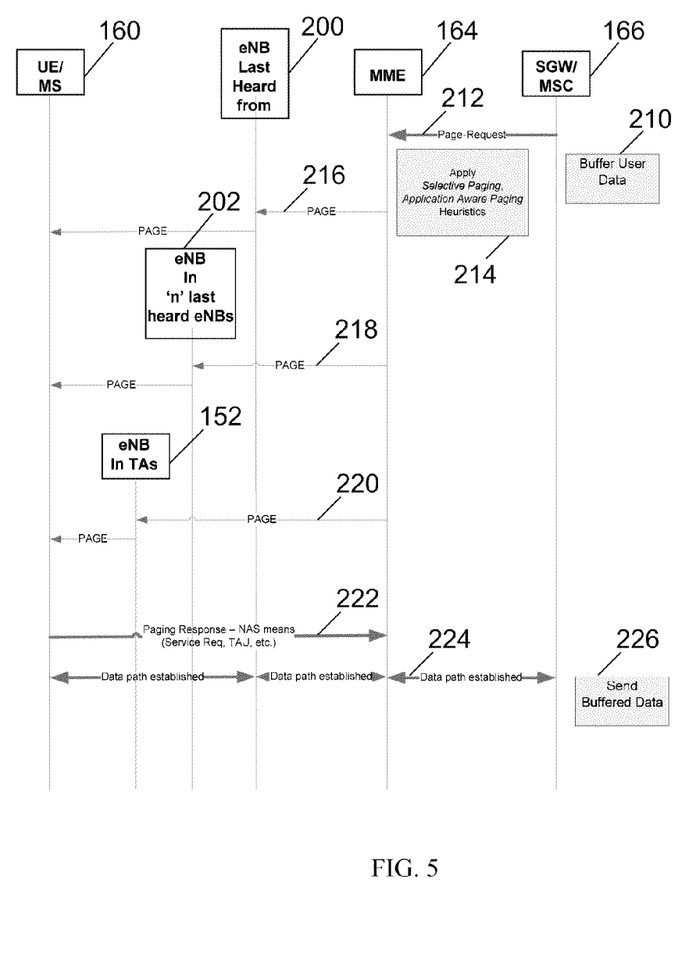
FIG. 5 illustrates a signaling flow with paging heuristics in accordance with certain embodiments.

FIG. 5 illustrates a signaling flow with paging heuristics in accordance with certain embodiments. The network devices in FIG. 5 include SGW/MSC 166, MME 164, eNodeB (eNB) last heard from 200, 'n' last eNBs 202, eNBs in the tracking area 152, and user equipment/mobile subscriber 160. In 210, user data is received and buffered at the SGW/MSC 166. In 212, the SGW/MSC 166 sends a page request to the MME 164. In 214, the MME 164 can analyze the page request with a number of criteria such as determining the priority, deciding whether to allow the page (e.g., is it an authorized application?), and applying page heuristics (which can be based on the priority).

In one case, the MME 164 sends a page 216 to the eNB that was last heard from 200. There is probability that the mobile device being sought may still remain within range of the last base station (such as an eNB) that communicated with the mobile device. Depending on the outcome of paging the last eNB heard from 200, the MME 164 sends a page 218 to a specified number of eNBs from which the mobile device was last heard from 202. This can be a defined subset of base stations that are paged instead, and the number of base stations paged can be defined based on the page. For example, criteria can be used to analyze the page and determine how to handle the page. Depending on the outcome of paging eNBs in 202, the MME 164 can send a page 220 to the eNBs in the tracking area 152 to find the mobile device or UE 160. When the UE 160 receives a page over the radio access interface between the base station and the UE, the UE 160 sends a paging response 222, which can include a service request, a tracking area update, and other information. In 224, a data path can be established to the UE 160 and the data buffered at the SGW/MSC can be sent in 226.

A chassis can be used implement multiple and different integrated functionalities and implement paging heuristics. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 6:
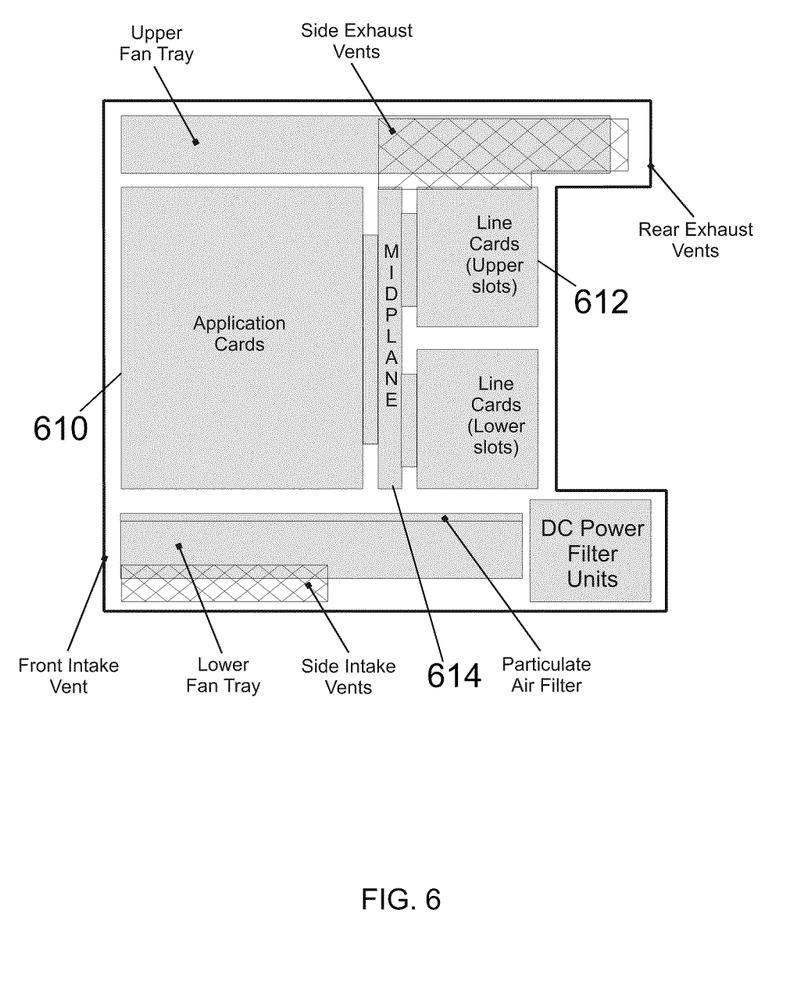
FIG. 6 illustrates a chassis in accordance with certain embodiments.

The features of a chassis that implements a gateway, in accordance with some embodiments, are further described below. FIG. 6 illustrates positioning of cards in the chassis in accordance with some embodiments. The chassis includes slots for loading application cards 610 and line cards 612. A midplane 614 can be used in the chassis to provide intra-chassis communications, power connections, and transport paths between the various installed cards. The midplane 614 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides mutli-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow. Other embodiments are within the following claims. For example, a chassis can implement a MME that provides heuristic based paging and a serving gateway function.

We claim:

1. A method of paging a user equipment (UE) from a mobility management entity (MME) in a communication network, where the communication network includes a plurality of eNodeBs that are arranged into at least one tracking area, the method comprising:
   maintaining, at the MME, a list of eNodeBs from which the UE was actively communicating with the communication network;
   receiving a page request for the UE at the MME and locating the tracking area where the UE was last registered;
   determining, at the MME, to apply heuristic based paging in sending the page request to the plurality of eNodeBs in the tracking area;
   inspecting the page request, at the MME, to determine a category of application for which the page request was issued;
   determining, at the MME, the delay sensitivity of the category of application;
   determining, at the MME, a pre-defined priority for handling the page request based on the determined delay sensitivity;
   selecting a heuristic in paging the UE depending on the priority for handling the page request;
   sending a first page request to a first subset of the eNodeBs in the tracking area based on the list of eNodeBs from which the UE was last actively communicating;

determining, at the MME, if a subsequent page request is sent to a second subset of eNodeBs, wherein determining if a subsequent page request is sent includes waiting a certain period of time for a page response and initiating the sending of the subsequent page request when the certain period of time elapses;

sending the subsequent page request to the second subset with at least some different eNodeBs than the first subset, if a response is not received after the first page request; and expanding the number of eNodeBs a page request is sent to until a determination is made by the MME to refrain from sending another page request at that time.

2. The method of claim 1, further comprising:
receiving a paging response at the MME from the UE; and
initiating a call establishment procedure from the MME for the UE.

3. The method of claim 1, wherein the first subset includes eNodeBs from which the UE was last actively communicating and neighboring eNodeBs based on location information.

4. The method of claim 1, further comprising sending a third page request to a third subset of eNodeBs, wherein the third subset includes the plurality of eNodeBs in the tracking area without including the eNodeBs from the first subset and the second subset.

5. The method of claim 1, wherein the maintaining of the list includes inspecting messages received at the MME for tracking area identities from which the UE communicated and adding the tracking area identity to the list.

6. The method of claim 1, wherein the page request received at the MME is received from a serving gateway (SGW).

7. The method of claim 1, further comprising:
determining, at the MME, whether the page request originated from an authorized application; and
sending the page request from the MME after determining that the page request originated from an authorized application.

8. A mobility management entity (MME) that communicates with at least one eNodeB in a communication network to page a user equipment (UE), and where the communication network includes a plurality of eNodeBs that are arranged into at least one tracking area, the MME comprising:
a storage medium configured to store a list of eNodeBs from which the UE was actively communicating with the communication network;
a physical interface configured to receive a page request for the UE where the page request includes the tracking area where the UE was last registered, and to send page requests to at least one eNodeB; and
a processing unit configured to run a heuristic for determining to selectively send page requests to the plurality of eNodeBs in the tracking area including initiating a sending of a first page request to at least one eNodeB based on the list of eNodeBs from which the UE was last actively communicating and determining if a subsequent page request is sent to a second subset of eNodeBs, wherein determining if a subsequent page request is sent includes waiting a certain period of time for a page response and initiating the sending of the subsequent page request when the certain period of time elapses, and expanding the number of eNodeBs a page request is sent to until a determination is made to refrain from sending another page request at that time, wherein the heuristic is configured to determine a pre-defined priority for handling the page request based on a determined delay sensitivity of a category of application for which the page request was issued, and to select a heuristic in paging the UE that depends on the priority for handling the page request.

9. The MME of claim 8, wherein the list includes a set number of eNodeBs, and when the set number of eNodeBs is reached, an eNodeB is discarded from the list.

10. The MME of claim 8, wherein the heuristic initiates sending a third page request to a third set of eNodeBs, wherein the third set of eNodeBs includes the plurality of eNodeBs in the tracking area without including the eNodeBs of the first page request and the second page request.

11. The MME of claim 8, wherein the physical interface receives a paging response from the UE and the MME initiates a call establishment procedure.

12. The MME of claim 8, wherein the first page request to the at least one eNodeB further includes neighboring eNodeBs to the at least one eNodeB based on location information.

13. The MME of claim 8, wherein the processing unit is configured to process packets received on the physical interface and inspect the messages received at the MME for tracking area identities from which the UE communicated, and the processing unit updates the list with received tracking area identity information.

14. The MME of claim 8, wherein the page request received at the physical interface is received from a serving gateway (SGW).

15. The MME of claim 8, wherein the heuristic is configured to determine whether the page request originated from an authorized application and initiate a sending of the page request when the page request originated from an authorized application.

16. A method of paging a user equipment (UE) from a chassis coupled to a communication network, where the communication network includes a plurality of cell sites that are arranged into at least one tracking area, the method comprising:
maintaining, at the chassis, information regarding the plurality of cell sites in the tracking area;
receiving, at the chassis, a page request for the UE and locating the tracking area where the UE was last registered;
determining, at the chassis, to apply heuristic based paging in sending the page request to the plurality of cell sites in the tracking area;
inspecting the page request, at the chassis, to determine a category of application for which the page request was issued;
determining, at the chassis, the delay sensitivity of the category of application;
determining, at the chassis, a pre-defined priority for handling the page request based on the determined delay sensitivity;
selecting a heuristic in paging the UE depending on the priority for handling the page request;
sending a page request to a subset of the plurality of cell sites in the tracking area based on the information at the chassis including the cell site from which the UE was last actively communicating with the communication network;
determining, at the chassis, if a subsequent page request is sent to a second subset of cell sites to locate the UE in the communication network, wherein determining if a subsequent page request is sent includes waiting a certain period of time for a page response and initiating the sending of the subsequent page request when the certain period of time elapses;

sending the subsequent page request to the second subset with at least some different cell sites than the first subset, if a response is not received after the first page request; and expanding the number of cell sites a page request is sent to until a determination is made by the chassis to refrain from sending another page request at that time.

17. The method of claim 16, wherein the chassis includes a mobility management entity (MME) functionality that initiates paging requests to the UE.

18. The method of claim 16, further comprising:
determining, at the chassis, whether the page request originated from an authorized application; and
sending the page request from the chassis after determining that the page request originated from an authorized application.

19. The method of claim 16, wherein the information includes location information and activity information.

* * * * *